United States Patent
Stolt et al.

(10) Patent No.: US 9,758,342 B2
(45) Date of Patent: Sep. 12, 2017

(54) DETERMINATION OF THE MOVEMENT OF A SYNCHRONOUS MACHINE

(75) Inventors: Lauri Stolt, Helsinki (FI); Tuukka Kauppinen, Hyvinkää (FI)

(73) Assignee: KONE CORPORATION, Helsinki (FI)

( * ) Notice: Subject to any disclaimer, the term of this patent is extended or adjusted under 35 U.S.C. 154(b) by 290 days.

(21) Appl. No.: 12/941,517

(22) Filed: Nov. 8, 2010

(65) Prior Publication Data
US 2011/0108369 A1    May 12, 2011

Related U.S. Application Data

(63) Continuation of application No. PCT/FI2009/050359, filed on May 5, 2009.

(30) Foreign Application Priority Data

May 30, 2008   (FI) ...................... 20080387

(51) Int. Cl.
*B66B 1/30*   (2006.01)
*H02P 6/185*   (2016.01)

(52) U.S. Cl.
CPC ............... *B66B 1/30* (2013.01); *H02P 6/185* (2013.01); *H02P 2203/01* (2013.01); *H02P 2203/05* (2013.01)

(58) Field of Classification Search
USPC .............. 318/400.01, 400.04, 700, 720, 721; 187/391; 702/85, 94
See application file for complete search history.

(56) References Cited

U.S. PATENT DOCUMENTS

| | | | | |
|---|---|---|---|---|
| 4,090,116 | A | * | 5/1978 | Lippitt .......................... 388/813 |
| 5,057,759 | A | * | 10/1991 | Ueda et al. .................... 318/616 |
| 5,786,593 | A | * | 7/1998 | Ohtomo et al. .......... 250/231.14 |
| 5,796,228 | A | * | 8/1998 | Kojima et al. ................ 318/605 |
| 6,124,688 | A | * | 9/2000 | Coles et al. .............. 318/400.09 |
| 6,415,208 | B1 | * | 7/2002 | Pojda .............................. 701/19 |
| 7,408,314 | B2 | * | 8/2008 | Hayashi ................... 318/568.12 |
| 2002/0125113 | A1 | * | 9/2002 | Bhakta ..................... G01D 5/25 200/11 R |

(Continued)

FOREIGN PATENT DOCUMENTS

| DE | 3843318 A * 6/1990 |
| DE | 103 15 754 A1 10/2004 |

(Continued)

*Primary Examiner* — Kawing Chan
(74) *Attorney, Agent, or Firm* — Birch, Stewart, Kolasch & Birch, LLP

(57) ABSTRACT

Methods and an apparatuses for determining the movement of a synchronous machine are provided. An apparatus for determining the movement of a synchronous machine includes a determination for at least one electrical magnitude of the synchronous machine; a determination of the position error of the rotor of the synchronous machine, which is fitted to determine the position error of the rotor on the basis of the aforementioned at least one electrical magnitude of the synchronous machine; and also a correction of the movement signal of the incremental sensor, which is fitted to correct the read movement signal of the incremental sensor on the basis of the aforementioned determination of the position error of the rotor of the synchronous machine.

23 Claims, 5 Drawing Sheets

(56) References Cited

U.S. PATENT DOCUMENTS

| | | |
|---|---|---|
| 2002/0193963 A1* | 12/2002 | Coste et al. ............... 702/150 |
| 2004/0036428 A1* | 2/2004 | Bui et al. .................. 318/254 |
| 2004/0200671 A1* | 10/2004 | Kugiya et al. ............ 187/293 |
| 2005/0029972 A1* | 2/2005 | Imai et al. ................ 318/254 |
| 2005/0246123 A1* | 11/2005 | Hofbauer et al. ......... 702/116 |
| 2006/0020416 A1* | 1/2006 | Karasek .................... 702/141 |
| 2006/0186841 A1* | 8/2006 | Piefer ............. B41F 13/0045 318/85 |
| 2008/0173502 A1* | 7/2008 | Tyni et al. ................ 187/394 |

FOREIGN PATENT DOCUMENTS

| | | |
|---|---|---|
| EP | 0 281 798 A2 | 9/1988 |
| FI | 116993 B | 4/2006 |
| JP | 63-234886 A | 9/1988 |
| JP | 64-26392 A | 1/1989 |
| JP | 9-47066 A | 2/1997 |
| JP | 3397013 B2 | 2/2003 |
| JP | 2007-312535 A | 11/2007 |

\* cited by examiner

-prior art-

-prior art-

DETERMINATION OF THE MOVEMENT OF A SYNCHRONOUS MACHINE

CROSS REFERENCE TO RELATED APLICATIONS

This application is a Continuation of PCT International Application No. FI2009/050359 filed on May 5, 2008, which claims the benefit of patent application Ser. No. 20080387 filed in Finland on May 30, 2008. The entire contents of all of the above applications is hereby incorporated by reference into the present application.

FIELD OF THE INVENTION

The object of the invention is a method for determining the movement of a synchronous machine as defined in the preamble of claim 1, an apparatus for determining the movement of a synchronous machine as defined in the preamble of claim 4, and also an arrangement for determining the movement of a conveying apparatus as defined in the preamble of claim 7.

BACKGROUND

In the regulation of a synchronous motor, the position of the rotor is conventionally identified with a measuring absolute encoder, such as a resolver. The measuring accuracy of a resolver is extremely small. In addition, a resolver, as also other absolute sensors, must generally be installed on the shaft of the motor, which owing to the construction of the motor might be awkward. An absolute sensor installed on the shaft can also increase the axial length of the motor.

Recently, different sensorless identifications of position have also been developed, which are based on e.g. measurement of the inductance of the magnetic circuit of the motor as well as on estimation of the source voltage of the motor.

The basic principle in measurement of the inductance of a magnetic circuit is that an excitation is supplied to the motor as voltage pulses or current pulses and the response caused by them is measured to determine the inductance. The inductance varies as a function of the electrical angle at least to some extent, in which case the position between the rotor and the stator can be determined from the variation of the inductance. The determination of the inductance can be performed depending on the method for a rotor locked in its position or also for a rotating rotor.

In the aforementioned methods the accuracy of determining the position of the rotor varies. Especially in solid rotor electric motors the variation of the inductance is generally extremely small, in which case the inaccuracy of the determined position information increases. The variation in inductance is normally small also e.g. in the types of permanent-magnet motors in which the permanent magnets are fixed to the surface of the rotor as surface magnets.

For measuring inductance, the excitation signal supplied to the motor is summed with the actual supply voltage of the motor. That being the case the excitation signal reduces the maximum value of the amplitude of the supply voltage of the motor. This might lead to a reduction of the operating speed range of the motor, e.g. when supplying the motor with a frequency converter having an intermediate voltage circuit.

The source voltage of the motor can be estimated e.g. on the basis of the measurement of the stator current and of the stator voltage. The accuracy of the estimation of the source voltage decreases as the speed of the motor decreases, and estimation at zero speed is not normally possible.

Publication U.S. Pat. No. 5,057,759 discloses a determination of the rotor angle and the rotor angular velocity of the rotor of an alternating-current motor by means of a state observer.

SUMMARY

The object of this invention is to solve the problems presented above in the description of prior art as well as the problems disclosed in the description of the invention below. In this case a determination of the movement of a synchronous machine that is more accurate than prior art is disclosed in this invention. In the determination just an incremental sensor can be used in the measurement feedback about the movement of the rotor. The invention also discloses a determination of the movement of a conveying apparatus using the aforementioned determination of the movement of a synchronous machine, in which case also the movement of a conveying apparatus can also be determined more accurately than before.

The method for determining the movement of a synchronous machine according to the invention is characterized by what is disclosed in the characterization part of claim 1. The apparatus for determining the movement of a synchronous machine according to the invention is characterized by what is disclosed in the characterization part of claim 4. The arrangement according to the invention for determining the motion of a conveying apparatus is characterized by what is disclosed in the characterization part of claim 7. Other features of the invention are characterized by what is disclosed in the other claims. Some inventive embodiments are also discussed in the descriptive section of the present application. The inventive content of the application can also be defined differently than in the claims presented below. The inventive content may also consist of several separate inventions, especially if the invention is considered in the light of expressions or implicit sub-tasks or from the point of view of advantages or categories of advantages achieved. In this case, some of the attributes contained in the claims below may be superfluous from the point of view of separate inventive concepts.

In the method according to the invention for determining the movement of a synchronous machine the movement signal of an incremental sensor is read; at least one electrical magnitude of the synchronous machine is determined; the position error of the rotor of the synchronous machine is determined on the basis of the aforementioned at least one electrical magnitude of the synchronous machine; and also the read movement signal of the incremental sensor is corrected on the basis of the determination of the aforementioned position error of the rotor of the synchronous machine.

Since a cumulative error generally occurs in the movement signal of an incremental sensor, the use of an incremental sensor in applications that have demanding requirements for accuracy has conventionally been awkward. These types of applications that require accuracy include e.g. the vector control of a synchronous motor or the measurement and monitoring of the movement of a conveying apparatus. As the read movement signal of the incremental sensor is corrected according to the invention on the basis of the determination of the position error of the rotor of the synchronous machine, an incremental sensor can also be used in these applications that require accuracy.

According to the invention the position error of the rotor of the synchronous machine can be determined on the basis of at least one electrical magnitude of the synchronous machine, in which case the aforementioned determination of the position error can be performed without a separate absolute sensor, and the measuring arrangement is simplified.

The incremental sensor according to the invention can be fitted e.g. via a friction wheel onto the surface of any moving part whatsoever of the synchronous machine. The sensor can be fitted e.g. to the rim of the rotor of a synchronous machine, or for instance to the rim of the traction sheave of an elevator machine. In this case the fixing arrangement of the sensor is simpler and more space efficient than in those prior-art solutions in which an absolute sensor is fixed concentrically on the shaft of the synchronous machine.

In one embodiment of the invention the position error of the rotor of the synchronous machine is determined, using the information about the source voltage of the synchronous machine conveyed by the aforementioned at least one electrical magnitude of the synchronous machine. In one embodiment of the invention the position error of the rotor of the synchronous machine is determined, using the information about the source voltage of the synchronous machine, which information is conveyed by the current and voltage of the synchronous machine.

In one embodiment of the invention the maximum permitted travel distance of the essentially low speed of the synchronous machine is determined on the basis of the aforementioned determination of the position error of the rotor of the synchronous machine.

The apparatus according to the invention for determining the movement of a synchronous machine comprises an input for the movement signal of the incremental sensor, a determination for at least one electrical magnitude of the synchronous machine, a determination of the position error of the rotor of the synchronous machine, which is fitted to determine the position error of the rotor on the basis of the aforementioned at least one electrical magnitude of the synchronous machine, and also a correction of the movement signal of the incremental sensor, which is fitted to correct the read movement signal of the incremental sensor on the basis of the aforementioned determination of the position error of the rotor of the synchronous machine.

In one embodiment of the invention the apparatus comprises a determination of the position error of the rotor of the synchronous machine, which is fitted to determine the position error of the rotor of the synchronous machine using the information about the source voltage of the synchronous machine conveyed by the aforementioned at least one electrical magnitude of the synchronous machine. In one embodiment of the invention the position error of the rotor of the synchronous machine is determined, using the information about the source voltage of the synchronous machine, which information is conveyed by the current and voltage of the synchronous machine.

In one embodiment of the invention the apparatus comprises a determination of the maximum permitted travel distance of the essentially low speed of the synchronous machine, which is fitted to determine the maximum permitted travel distance of the essentially low speed of the synchronous machine on the basis of the aforementioned determination of the position error of the rotor of the synchronous machine.

The arrangement according to the invention for determining the movement of a conveying apparatus comprises a synchronous motor for moving the conveying apparatus, an incremental sensor fitted in connection with a synchronous motor, a determination for at least one electrical magnitude of the synchronous machine, a determination of the position error of the rotor of the synchronous machine, which is fitted to determine the position error of the rotor on the basis of the aforementioned at least one electrical magnitude of the synchronous machine, and also a correction of the movement signal of the incremental sensor, which is fitted to correct the read movement signal of the incremental sensor on the basis of the aforementioned determination of the position error of the rotor of the synchronous motor, and also a determination of the movement of the conveying apparatus, which is fitted to determine the movement of the conveying apparatus on the basis of the aforementioned corrected movement signal of the incremental sensor.

When the movement of the conveying apparatus is determined according to the invention on the basis of the corrected movement signal of the incremental sensor, the accuracy of the determination of the movement of the conveying apparatus, such as the accuracy of the determination of a change in the position of the conveying apparatus, improves. At the same time e.g. the stopping accuracy of the conveying apparatus also improves.

In one embodiment of the invention the arrangement comprises a determination of the position error of the rotor of the synchronous motor, which is fitted to determine the position error of the rotor of the synchronous motor using the information about the source voltage of the synchronous motor conveyed by the aforementioned at least one electrical magnitude of the synchronous motor.

In one embodiment of the invention the arrangement comprises a determination of the maximum permitted travel distance of the essentially low speed of the conveying apparatus, which is fitted to determine the maximum permitted travel distance of the essentially low speed of the conveying apparatus on the basis of the aforementioned determination of the position error of the rotor of the synchronous motor.

As the maximum permitted travel distance of the essentially low speed of the synchronous machine is determined on the basis of the determination of the position error of the rotor of the synchronous machine, the movement of the essentially low speed of the synchronous machine can be restricted to a permitted area. This is advantageous e.g. in elevator systems, when driving the elevator car at the essentially low speed in the proximity of a stopping floor or in an end zone of the elevator hoistway, or when positioning the elevator car to some reference point of the elevator hoistway in the absence of position information of the elevator car. A limit value of the maximum permitted travel distance can in this case be set for the travel distance of the essentially low speed of the elevator car, and the movement of the elevator car can be prevented when the aforementioned limit value is exceeded, in which case the safety of the elevator system is improved. To restart the trip in this case can require determination of the initial angle of the rotor with some prior-art method, such as on the basis of the measurement of the inductance of the magnetic circuit.

In one embodiment of the invention the conveying apparatus comprises an elevator car.

The synchronous machine according to the invention can be e.g. a synchronous motor or a synchronous generator. In this case the synchronous machine can be magnetized e.g. with a rotor winding or with permanent magnets. The synchronous machine can also be a direct-current machine without brushes. The synchronous machine can be rotating or it can also be fitted to operate on the linear motor principle.

In the invention an incremental sensor means a sensor that expresses a change in the position of the rotor directly or indirectly e.g. on the basis of a measurement of speed or acceleration. These types of sensors are e.g. an encoder, a tachometer and an acceleration sensor.

In one embodiment of the invention the synchronous motor is fitted to move the conveying apparatus of a conveying system. This type of conveying system can be e.g. an elevator system, an escalator system, a travelator system, a direct drive elevator system, a crane system or a vehicle system. If the synchronous motor is fitted to an elevator system, the motor drive can also comprise a traction sheave connected to the hoisting rope or hoisting belt of the elevator. The synchronous motor drive can comprise a gear, but it can also be gearless.

The electrical angle of the synchronous machine refers to the angle value determined by the cycle length of the magnetic flux rotating in the synchronous machine. In one embodiment of the invention the cycle length of the magnetic flux corresponds here to an electrical angle of 360 degrees in the synchronous machine.

In the invention, an electrical magnitude of the synchronous machine refers to e.g. the current, voltage and output power of the synchronous machine, as well as to the corresponding reference values for them.

In one embodiment of the invention the determination of an electrical magnitude of the synchronous machine comprises a current sensor. The current sensor can comprise e.g. a current transformer, a Hall sensor, a magneto-resistive sensor or a measuring resistor.

In one embodiment of the invention the determination of an electrical magnitude of the synchronous machine comprises a voltage sensor. The voltage sensor can in this case comprise e.g. a measuring transformer, a linear or digital opto-isolator, or a measuring resistor.

In the invention movement of the synchronous machine means e.g. a change in the position of the rotor, and also the speed information and acceleration information of the rotor. Movement of the conveying apparatus means correspondingly e.g. the change in the position or location of the conveying apparatus, as well as the speed information and acceleration information of the conveying apparatus.

In one embodiment of the invention the corrected movement signal of the incremental sensor is used for monitoring the movement of a conveying apparatus. The increased accuracy of the movement signal in this case improves the accuracy and the reliability of also the monitoring of movement. The frequency converter according to the invention can be e.g. a frequency converter having a current intermediate circuit, a frequency converter having a voltage intermediate circuit, and a matrix converter.

Source voltage means the voltage induced in the stator winding by the movement of the magnetized rotor.

The solid-state switch according to the invention can be e.g. an IGBT transistor, a MOSFET transistor or a thyristor.

DESCRIPTION OF THE DRAWINGS

In the following, the invention will be described in more detail by the aid of a few examples of its embodiments with reference to the attached drawings, wherein.

DETAILED DESCRIPTION

Figure 1:
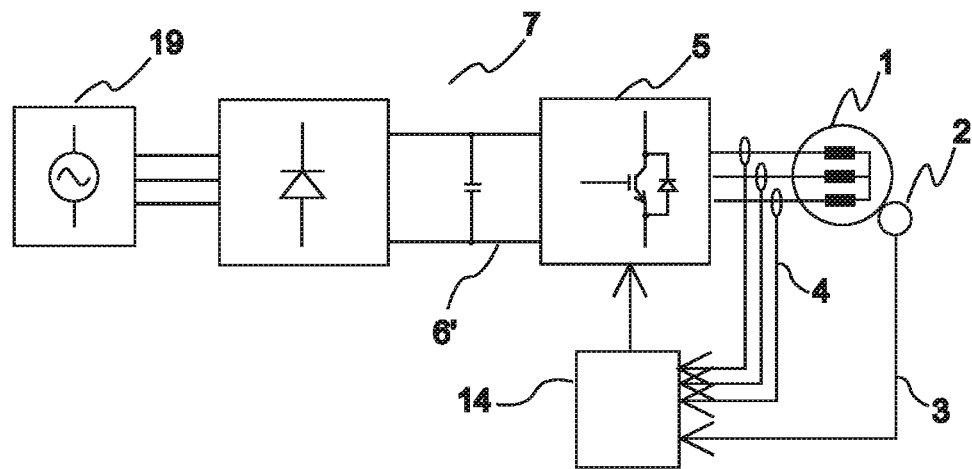
FIG. 1 presents a frequency converter, which comprises an apparatus according to the invention for determining the movement of a synchronous machine

FIG. 1 presents a frequency converter 7, which comprises an apparatus for determining the movement of a synchronous machine according to the invention. The frequency converter 7 is fitted to supply power between the synchronous machine 1 and the electricity network 19. The frequency converter comprises a load bridge 5, which is connected to the stator winding of the synchronous machine. The control 14 of the frequency converter is fitted to control the solid-state switches of the load bridge 5, for forming a variable amplitude and variable frequency control voltage to the phases of the stator winding of the synchronous machine. An encoder 2 is fitted via a friction wheel to the rim of the rotor of the synchronous machine, in which case when the rotor rotates the rotating shaft of the encoder fixed to the friction wheel rotates via the friction wheel. The encoder comprises an output for the movement signal 3 expressing the movement of the rotor of the synchronous machine.

The apparatus for determining the movement of a synchronous machine is integrated as a part of the control 14 of the frequency converter. The control 14 comprises in this case an input for the movement signal 3 of the encoder. The control also measures the current 4 of the stator winding of the synchronous machine. The control 14 is fitted to determine the position error of the rotor of the synchronous machine on the basis of the measured current 4 of the stator winding as well as on the basis of the stator voltage determined from the switching reference of the solid-state switches of the load bridge 5. The control is further fitted to correct the read movement signal 3 of the encoder on the basis of the aforementioned determination 9 of the position error of the rotor of the synchronous machine.

The transmission ratio of the encoder 2 is determined from the ratio of the diameter of the friction wheel of the encoder and the diameter of the rotor rim of the synchronous machine. So that the movement of the rotor can be determined from the movement signal 3 of the encoder, the aforementioned transmission ratio must be known. The tolerances of the friction wheel and of the rotor rim, among other things, cause an error in the transmission ratio; also, for example, wear of the friction wheel causes a change in the transmission ratio. When the movement signal 3 of the encoder is corrected according to the invention on the basis of the determination 9 of the position error of the rotor, the aforementioned measuring errors caused by the variation of the transmission ratio can be compensated, in which case also the change in the position of the rotor can be determined from the movement signal 3 more accurately than in prior art.

Figure 2:
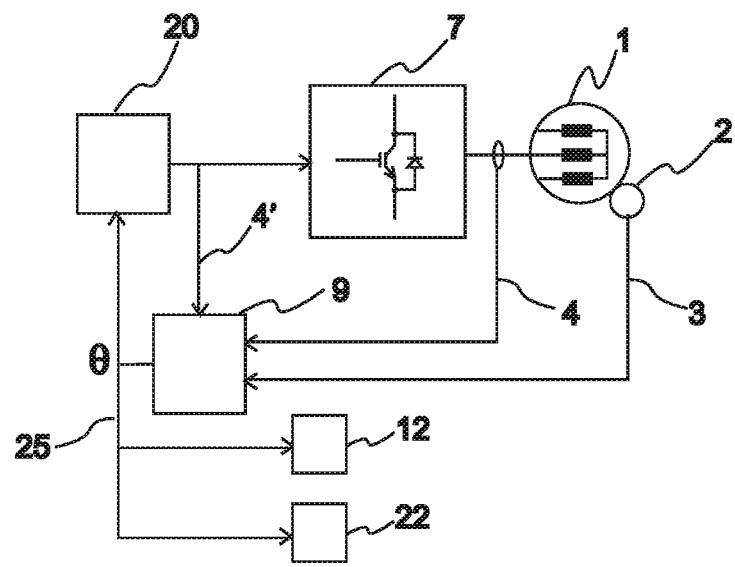
FIG. 2 presents a control arrangement of a synchronous machine according to the invention

FIG. 2 presents a control arrangement of a synchronous machine according to the invention. Power is supplied to the synchronous machine 1 in a controlled manner with the frequency converter 7. Control of the frequency converter 7 occurs with vector regulation 20. The control arrangement of the synchronous Machine also comprises an apparatus 9, 12 for determining the movement of the synchronous machine. The stator currents 4 of the synchronous machine are measured, and the stator voltage 4' is estimated from the voltage reference of the stator voltage formed by the vector control 20. The position error of the rotor of the synchronous machine is determined on the basis of the measured and the estimated stator currents and stator voltages. The movement signal 3 of the incremental sensor of the synchronous machine is read, and the read movement signal is corrected on the basis of the aforementioned determination 9 of the position error of the rotor of the synchronous machine. The corrected movement signal 25 expressing the change in the position of the rotor of the synchronous machine is taken to the vector control 20 of the synchronous machine, and it is used with a prior-art method as an angle feedback of the vector control. The corrected movement signal 25 is also used for monitoring 22 the movement of the synchronous machine.

The maximum permitted travel distance position of the essentially low speed of the synchronous machine is determined 12 on the basis of the determination 9 of the position error of the rotor of the synchronous machine.

Figure 3:
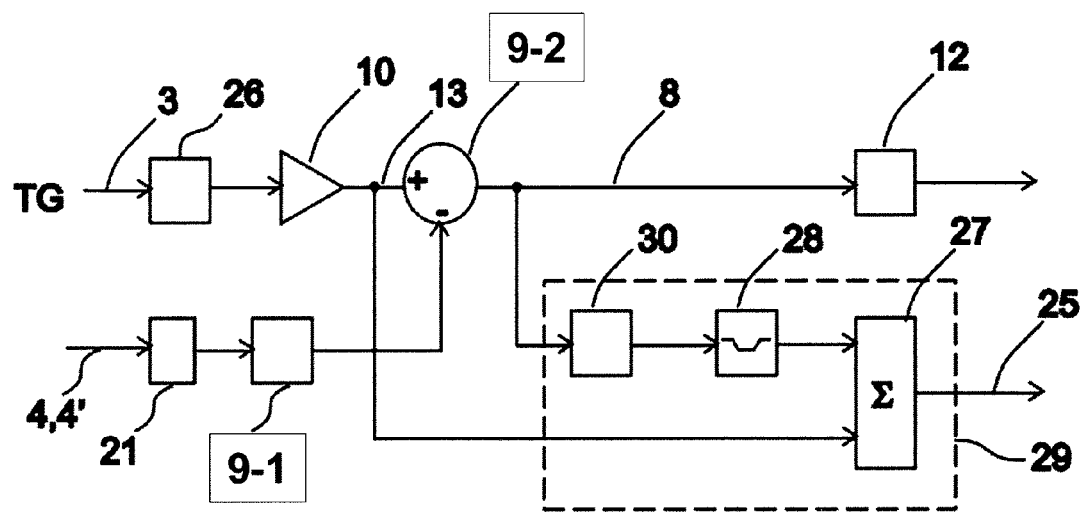
FIG. 3 presents a determination of the movement of a synchronous machine according to the invention as a block diagram

FIG. 3 presents as a block diagram a determination of the movement of a synchronous machine according to the invention. The three-phase stator current 4 of the synchronous machine is measured at the sampling frequency $\Delta$, and the measured three-phase current $i_A$, $i_B$, $i_C$ is converted into a two-component reference frame $I_\alpha$, $I_\beta$ of the stator coordinates with Clarke's Transformation 21 according to the equation (1):

$$\begin{bmatrix} i_\alpha \\ i_\beta \end{bmatrix} = \sqrt{2/3} \begin{bmatrix} 1 & -1/2 & -1/2 \\ 0 & \sqrt{3}/2 & -\sqrt{3}/2 \end{bmatrix} \begin{bmatrix} i_A \\ i_B \\ i_C \end{bmatrix} \quad (1)$$

An estimate $u_A$, $u_B$, $u_C$ of the three-phase supply voltage reference 4' of the frequency converter is formed for the supply voltage of the stator winding of the synchronous machine, and the estimate is described as a two-component reference frame $u_\alpha$, $u_\beta$ of the stator coordinates in a corresponding manner:

$$\begin{bmatrix} u_\alpha \\ u_\beta \end{bmatrix} = \sqrt{2/3} \begin{bmatrix} 1 & -1/2 & -1/2 \\ 0 & \sqrt{3}/2 & -\sqrt{3}/2 \end{bmatrix} \begin{bmatrix} u_A \\ u_B \\ u_C \end{bmatrix} \quad (2)$$

In this embodiment of the invention an estimate is determined 9-1 for the position $\theta$ of the magnetic pole of the rotor in the stator coordinate system using the equation (3) presented in the publication "Digital sliding mode based references limitation law for sensorless control of an electromechanical system; Sergey Ryvkin, Dimitri Izosimov and Eduardo Palomar-Lever; International Conference on Control and Synchronization of Dynamical Systems, Journal of Physics: Conference Series 23 (2005) 192-201":

$$\theta = -\arctan \frac{i_\alpha^{n+1} - i_\alpha^n - \frac{\Delta}{L}(u_\alpha^n - r i_\alpha^n)}{i_\beta^{n+1} - i_\beta^n - \frac{\Delta}{L}(u_\beta^n - r i_\beta^n)} \quad (3)$$

The position $\theta$ of the magnetic pole of the rotor is determined as an electrical angle, in which case the corresponding position angle of the rotor is obtained by dividing the determined position $\theta$ of the magnetic pole by the number of pole pairs of the motor.

The encoder signal 3 is a double-channel one comprising pulses, the number n of which is proportional to the change in the position angle of the rotating shaft of the encoder. The change $\Delta\epsilon$ in the position angle of the rotating shaft of the encoder can thus be determined from the equation (4), where the number of pulses of a channel of the encoder with a complete rotation $2\pi$ of the rotating shaft is R:

$$\Delta\varepsilon = \frac{n * 2\pi}{R} \quad (4)$$

The encoder is installed via the friction wheel onto the rim of the rotor of the synchronous machine, in which case the changes in the positions of the friction wheel and of the rotor of the synchronous machine correspond to each other with the transmission ratio 10 determined by the diameters of the friction wheel and of the rim of the rotor. Here the friction wheel is fixed concentrically onto the rotating shaft of the encoder. The double-channel encoder signal 3 is read with the counter 26, which counts the number of arriving pulses. The counting direction of the counter is selected according to the direction of rotation of the rotating shaft of the encoder. The direction of rotation of the rotating shaft is determined from the double-channel encoder signal, on the basis of the phase difference of the pulse patterns of the first and the second channel.

The encoder signal read with the counter 26 is scaled 10 by the transmission ratio between the friction wheel of the encoder and the rim of the rotor of the synchronous machine. The read and scaled encoder signal 13 is compared by means of the equation (3) to the information determined 9 about the position angle of the rotor, and on the basis of the comparison 9-2 the position error 8 of the rotor of the synchronous machine is determined.

Figure 6:
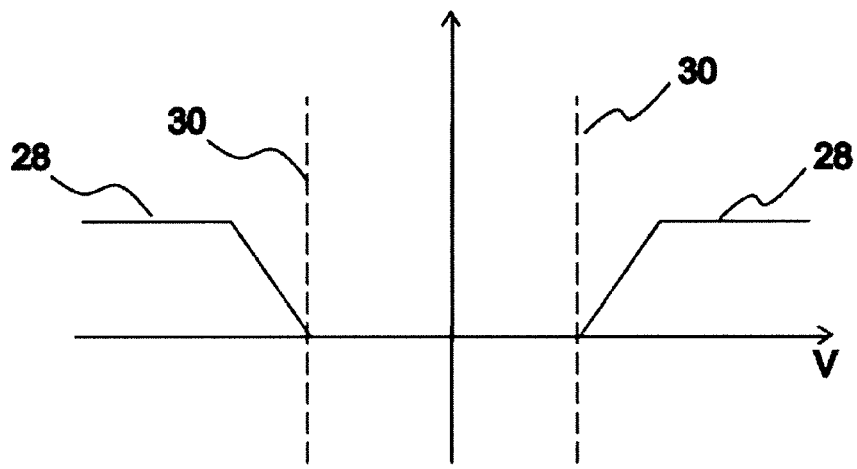
FIG. 6 presents the scaling factor of a correcting circuit of the encoder signal according to the invention

The correcting circuit 29 of the encoder signal functions in the following manner: the position error 8 is filtered with a low-pass filter 30, and on the basis of the filtered position error the encoder signal 13 is corrected by repetitively summing 27 a correction term, which is proportional to the magnitude of the position error 8, into the encoder signal 13. The correction circuit 29 of the encoder signal comprises a scaling factor 28, the value of which is determined as a function of the velocity v of the rotor. The scaling factor 28 is presented in FIG. 6. The value of the scaling factor is determined as zero in the environment of zero speed of the rotor. When the value of the scaling factor is zero, the aforementioned encoder signal is not corrected with the correcting circuit 29. In other words the correcting circuit 29 of the encoder signal is fitted to correct the encoder signal 13 only when the velocity of the rotor differs from zero by more than the set limit value 30. This is because the position information of the magnetic pole of the rotor determined on the basis the equation (3) is based on the information about the source voltage of the synchronous machine conveyed by the measurements of stator voltage and stator current. Since the source voltage is proportional to the velocity of the rotor, the determination accuracy of the position information decreases as the velocity of the rotor decreases. In this case the determination accuracy of the position error of the rotor 5 determined on the basis of the position information also decreases.

On the basis of the position error 8 the maximum permitted travel distance of the essentially low speed of the synchronous machine is determined 12. The aforementioned essentially low speed of the synchronous machine means the speed range, when operating in which the encoder signal 13 is not corrected. The encoder signal 13 is not corrected e.g. when the aforementioned scaling factor 28 receives the value zero. Travel distance means movement in the direction of the rim of the rotating rotor.

The determination of the maximum permitted travel distance of the essentially low speed occurs in this embodiment of the invention as follows: the synchronous machine is moved at a speed at which the correcting circuit 29 of the encoder signal is fitted to correct the encoder signal. In this case the value of the scaling factor 28 of the correcting circuit 29 deviates from zero. The change $\theta_r$ 13 of the position of the rotor of the synchronous machine during the aforementioned movement is determined from the encoder signal 3. In addition, the position error $\theta_e$ 8 of the rotor during the aforementioned movement is determined.

$$\theta_e = \theta_r - \theta \quad (5)$$

in which case the transmission error $S_e$ is obtained from the equation (6):

$$S_e = \frac{\theta_e}{\theta_r} \quad (6)$$

The transmission error produces a cumulative error in the position data of the rotor determined from the encoder signal. A permitted maximum value can be set for the magnitude of the error e.g. using the maximum permitted angle error $\Delta\gamma$, expressed in degrees of electrical angle, of the position measurement of the rotor of the synchronous machine as the criterion. The aforementioned angle error of the position measurement of the rotor causes in the regulation of the synchronous machine both an increase in the stator current and a weakening of the torque of the synchronous machine. In this case the maximum permitted travel distance $\Delta l$ of the essentially low speed can be determined by means of the number of pole pairs p of the motor, the transmission error $S_e$ of the encoder, the maximum permitted angle error $\Delta\gamma$ and the diameter of the rotor $D_r$:

$$\Delta l = \frac{\Delta\gamma * D_r}{S_e * p} \quad (7)$$

The scaling factor $K_0$ of the scaling 10 is corrected according to the equation (8) by means of the transmission error $S_e$ of the encoder determined according to the equation (6), in which case the transmission error of the corrected scaling K decreases.

$$K = K_0(1 - S_e) \quad (8)$$

Figure 4:
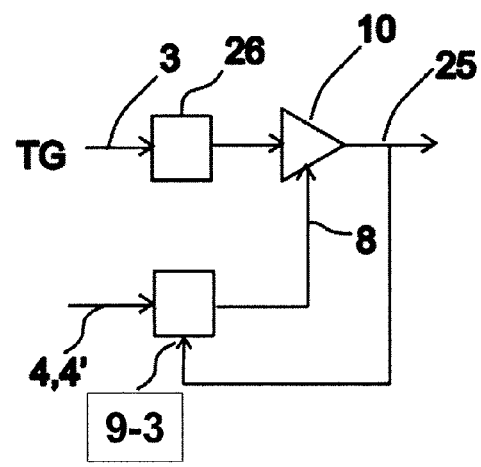
FIG. 4 presents a second determination of the movement of a synchronous machine according to the invention as a block diagram

FIG. 4 presents as a block diagram a second determination of the movement of a synchronous machine according to the invention. The movement signal 3 read by the encoder is scaled 10 to correspond to the change 25 in the position of the rotor. The source voltage of the synchronous machine is determined 9-3 on the basis of the measured currents 4 and supply voltages 4' of the synchronous machine. The source voltage is determined as rotating along with the rotor in the applied d,q reference frame using the prior-art Park's Transformation. The application of the reference frame is done by means of the corrected movement signal 25. The source voltage comprises a component $E_d$ that is proportional to the position error of the magnetic pole of the rotor, and the scaling 10 of the movement signal of the encoder is changed on the basis of the component $E_d$ of the source voltage that is proportional to the position error of the magnetic pole.

Figure 5:
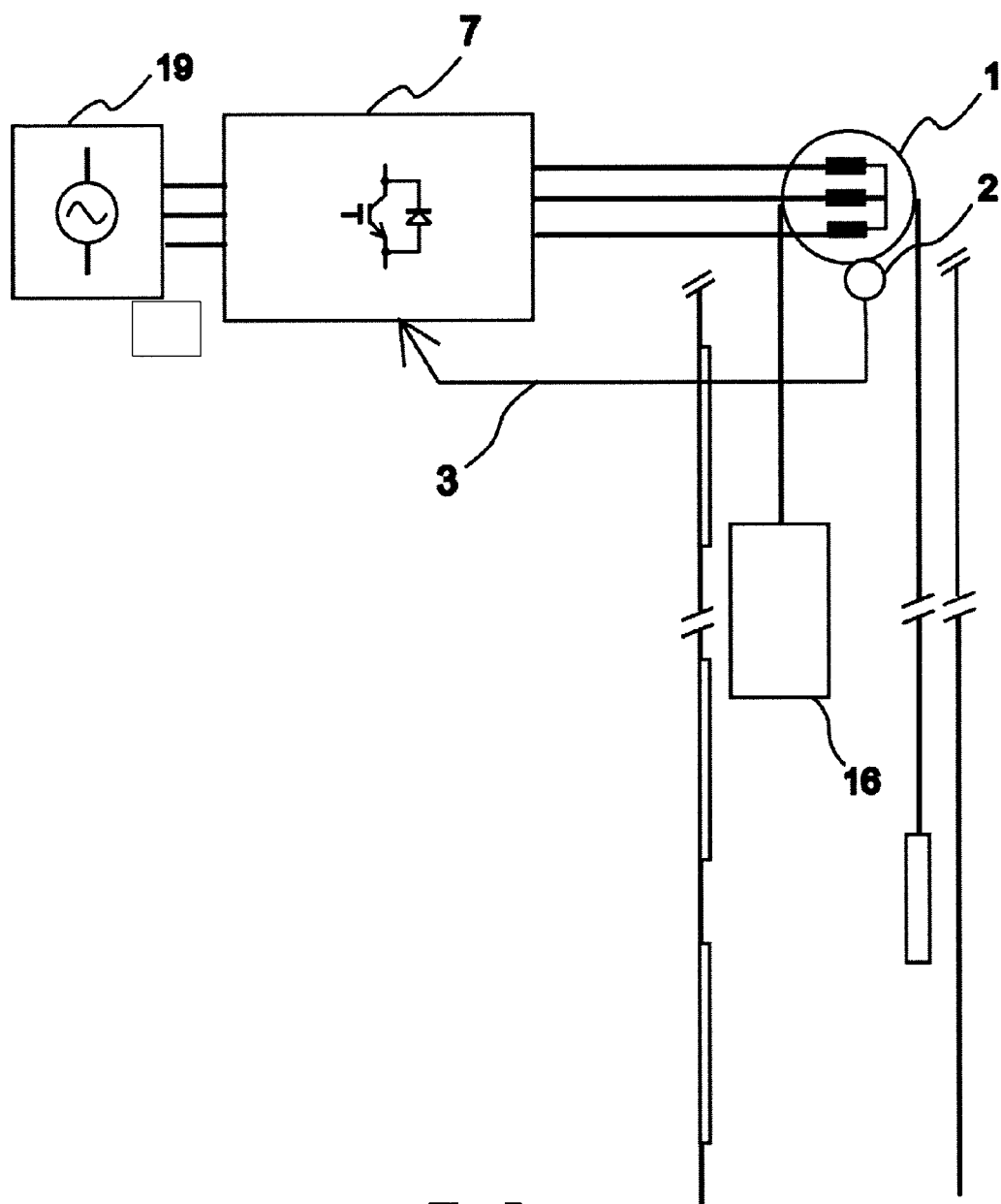
FIG. 5 presents an elevator system, into which an arrangement according to the invention for determining the movement of an elevator car is fitted

FIG. 5 presents an elevator system, into which an arrangement for determining the movement of an elevator car according to the invention is fitted. The elevator motor 1 is here a synchronous motor, the rotor of which is magnetized with permanent magnets. The power supply of the motor 1 occurs from the electricity network 19 with a frequency converter 7. A traction sheave is concentrically integrated in the rotor of the elevator motor, and the elevator motor is fitted to move the elevator car in the elevator hoistway via the elevator ropes connected to the traction sheave. An encoder 2 is fitted via a friction wheel to the rim of the traction sheave of the elevator motor 1, the movement signal 3 of which encoder is read, and the read movement signal is corrected on the basis of the determination 9 of the position error of the rotor of the elevator motor, using a correction of the movement signal 3 according to one of the embodiment examples described above.

The elevator system also comprises a determination of the movement of the elevator car 16, which is fitted to determine the movement of the elevator car 16 on the basis of the aforementioned corrected movement signal 25 of the encoder. As the movement of the elevator car is transmitted from the traction sheave of the elevator motor via the elevator ropes, the movement of the elevator car is determined in this embodiment of the invention directly on the basis of the determination of the movement of the traction sheave of the elevator motor. The movement of the traction sheave of the elevator motor is determined using the corrected movement signal 25 of the encoder 2 for the determination. The determination of the movement of the traction sheave is performed e.g. according to the embodiment of FIG. 3 or 4.

In this embodiment of the invention the elevator system also comprises a determination 12 of the maximum permitted travel distance of the essentially low speed of the elevator car. The essentially low speed of the elevator car means the speed at which the elevator car moves when the rotor of the elevator motor is moving at the essentially low speed, according to the embodiment example of FIG. 3. The maximum permitted travel distance of the essentially low speed of the elevator car is in this case determined from the maximum permitted travel distance of the essentially low speed of the rotor of the elevator motor.

As the movement of the rotor is determined according to the invention from the movement signal of the incremental sensor, the initial position of the rotor must also be determined with some prior-art method. One such method is presented e.g. in the publication "Peter B. Schmidt, Michael L. Gasperi, Glen Ray, Ajith H. Wijenayake: Initial Rotor Angle Detection Of A Non-Salient Pole Permanent Magnet Synchronous Machine" IEEE Industry Application Society, Annual Meeting, New Orleans, La., Oct. 5-9, 1997.

The initial position of the rotor can also be determined e.g. in the manner presented in patent application FI20080318.

Figure 7:
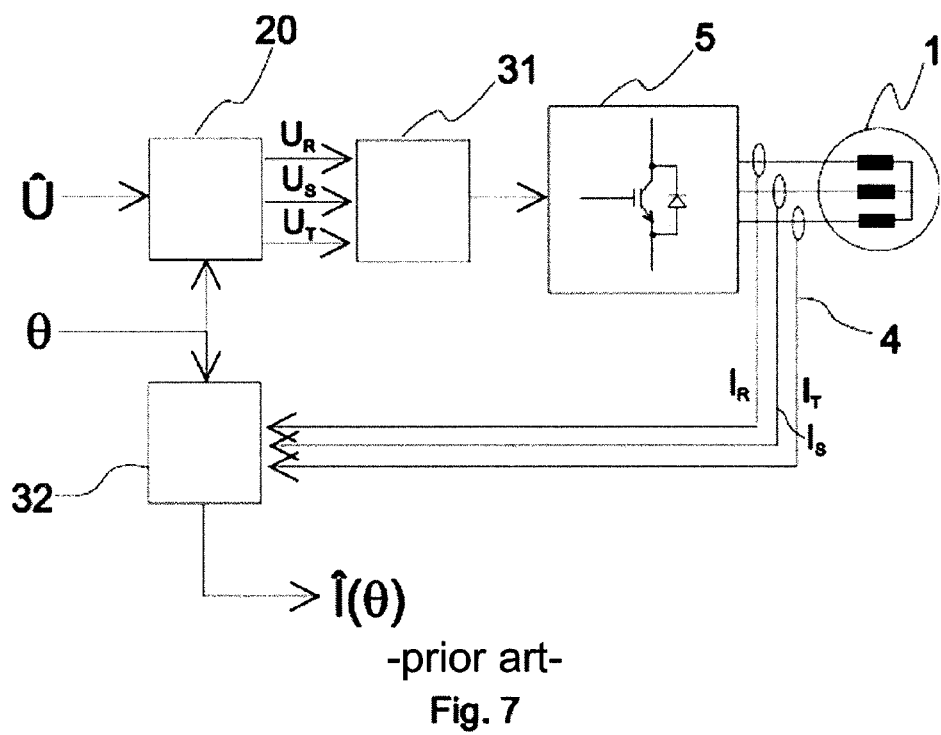
FIG. 7 presents a determination of the position of the rotor of a synchronous machine
Figure 8:
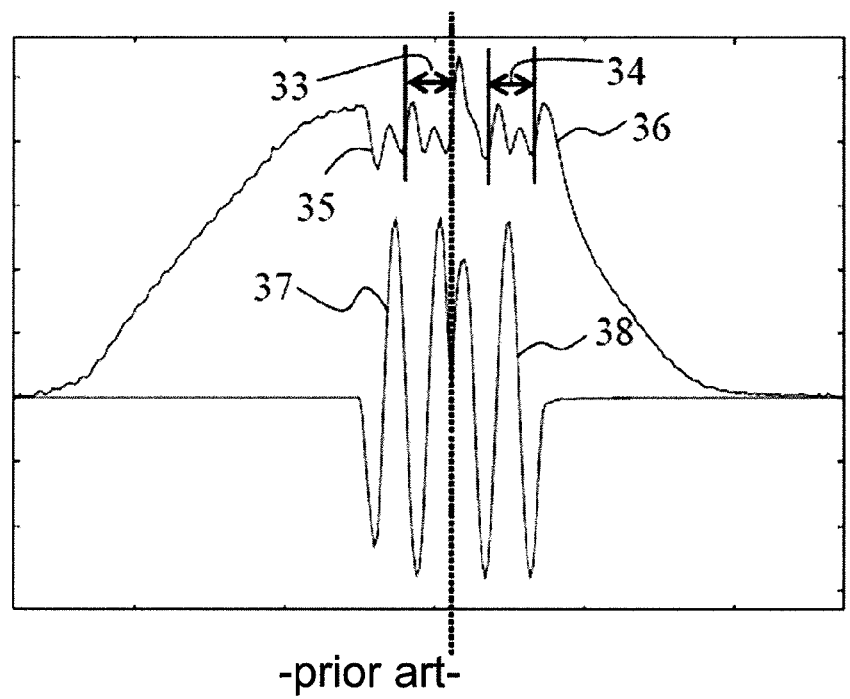
FIG. 8 presents the electrical parameters of the synchronous machine during a determination of the position of the rotor
Figure 9:
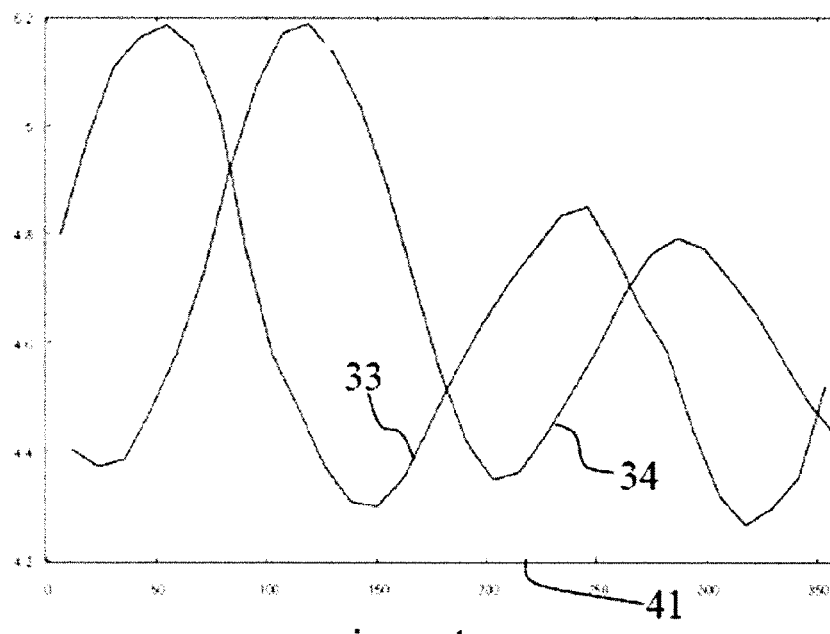
FIG. 9 presents the amplitude of the alternating current response signal as a function of the electrical angle of the synchronous machine

FIG. 7 presents as a block diagram one determination of the initial position of the rotor of a synchronous machine according to patent application FI20080318. Movement of the rotor of the synchronous machine 1 is prevented during the determination of the initial position of the rotor. The conversion block 20 forms the three-phase supply voltage reference $U_R$, $U_S$, $U_T$ of the synchronous machine from the amplitude reference $\hat{U}$ as well as from the electrical angle reference θ of the synchronous machine, in which case the three-phase supply voltage reference is formed as a function of the electrical angle reference θ. The supply voltage reference $U_R$ of the R phase is in this case of the form: $\hat{U}$ sin θ. The control 31 of the load bridge controls the solid-state switches of the load bridge 5 according to the aforementioned three-phase supply voltage reference $U_R$, $U_S$, $U_T$ for forming the first three-phase alternating voltage excitation signal 37 for the synchronous machine. The value of the electrical angle reference θ is changed evenly, in which case the rotation speed of the supply voltage reference and at the same time of the alternating voltage excitation signal 37,38 is constant. The first three-phase alternating current response signal $I_R$, $I_S$, $I_T$ 4 produced in the winding of the synchronous machine by the first three-phase alternating voltage excitation signal is measured as a function of the electrical angle reference θ of the synchronous machine. The amplitude of the measured first three-phase alternating current response signal 33,35 is determined 32 with some prior-art method, e.g. by forming a rotation indicator of the current vector for the three-phase alternating current response signal. The variation of the inductance of the magnetic circuit of the synchronous machine causes the amplitude $\hat{I}$ of also the measured first alternating current response signal 33,35 to vary as a function $\hat{I}(θ)$ of the electrical angle reference θ. The impedance of the magnetic circuit also causes a phase difference to form between the supplied first alternating voltage excitation signal 37 and the measured first alternating current response signal 33,35. To compensate for the phase difference, the measurement described above is repeated by supplying a second alternating voltage excitation signal 38 as a function of the electrical angle reference θ. The rotation direction of the second alternating voltage excitation signal 38 is selected to be the opposite to the rotation direction of the first alternating voltage excitation signal 37, in which case the phase difference between the first alternating voltage excitation signal 37 and the first alternating current response signal 33,35 forms to be in the opposite direction compared to the phase difference between the second alternating voltage excitation signal 38 and the second alternating current response signal 34,36. FIG. 8 presents the first alternating voltage excitation signal 37 of the R phase and also the second alternating voltage excitation signal 38 of the R phase, which are formed consecutively. The amplitude of the alternating voltage excitation signals is otherwise constant, but the amplitude of the second alternating voltage excitation signal 38 is reduced at the start. This is because the change in the rotation direction of the alternating voltage excitation signal causes a change phenomenon that affects the current of the winding of the synchronous machine, which is endeavored to be compensated for by transiently decreasing the amplitude of the voltage of the alternating voltage excitation signal 38. FIG. 8 also presents the amplitude of the first alternating current response signal 35 corresponding to the first alternating voltage excitation signal 37 as a function $\hat{I}(θ)$ of the electrical angle reference, and likewise the amplitude of the second alternating current response signal 36 corresponding to the second alternating voltage excitation signal 38 as a function of the electrical angle reference. FIG. 9 presents in more detail the amplitudes of the first 33 and the second 34 alternating current response signals for the cycle length of 0 . . . 360 degrees of electrical angle of the electrical angle reference θ of the synchronous machine. The variation in the amplitudes as a function of the electrical angle reference θ 41 results from the inductance of the magnetic circuit of the synchronous machine varying owing to, among other things, local saturation of the magnetic circuit. Here, local saturation refers to the type, of saturation phenomenon of a magnetic circuit, which varies in relation to the electrical angle of the synchronous machine. This kind of local saturation is caused by, among other things, the permanent magnets of the rotor, in which case the initial position of the permanent magnets of the rotor can be determined utilizing the local saturation. On the other hand, a variation of the geometry of the magnetic circuit, such as e.g. a variation in the length of the air gap of the synchronous machine, also causes a local variation of the inductance of the magnetic circuit of the synchronous machine. This type of variation in the length of the air gap occurs e.g. in salient pole synchronous machines. The aforementioned type of local variation of the inductance of the magnetic circuit caused by a variation of the geometry of the magnetic circuit of the electric machine can also be used for the determination of the initial position of the rotor.

The invention is described above by the aid of a few examples of its embodiment. It is obvious to the person skilled in the art that the invention is not limited to the embodiments described above, but that many other applications are possible within the scope of the inventive concept defined by the claims presented below.

It is obvious to the person skilled in the art that in the determination of the position error of the rotor of a synchronous machine according to the invention, it is possible to determine an estimate for the position θ of the rotor of the synchronous machine also using some unmentioned and, in itself, prior-art determination of the position of the rotor wherein the position of the rotor is determined from the electrical magnitudes of the synchronous machine.

The invention claimed is:
1. Method for determining the movement of a synchronous machine, the method comprising:
fitting an incremental sensor to a rim of a traction sheave of the synchronous machine at a fitting point such that the incremental sensor detects relative motion of a surface of a moving part at the fitting point;
reading a movement signal of the incremental sensor, the movement signal of the incremental sensor representing a relative movement of the surface of the moving part at the fitting point;
determining at least one electrical magnitude of the synchronous machine;
determining a position error of the moving part of the synchronous machine based on said at least one electrical magnitude and a transmission ratio determined by a linear movement range detected by the incremental sensor at the fitting point;
filtering the position error with a low-pass filter;
correcting the read movement signal of the incremental sensor based on said filtered position error by repetitively summing a correction term, which is proportional to a magnitude of the position error, into the read movement signal such that cumulative movement signal errors and errors caused by variations or changes in the linear movement range are accounted for; and supplying the corrected movement signal to a controller for controlling the synchronous machine.

2. Method according to claim 1:
said determining a position error includes using information about the source voltage of the synchronous machine conveyed by said electrical magnitude to determine the position error.

3. Method according to claim 1 or 2, the method further comprising:
determining a maximum permitted travel distance of an essentially low speed of the synchronous machine based on said position error.

4. The method of claim 1, said fitting including fitting the incremental sensor onto the moving part via a friction wheel.

5. The method of claim 1, said reading a movement signal including reading a measurement of linear distance traveled by the fitting point.

6. The method of claim 1, said incremental sensor including a tachometer, and said reading a movement signal including reading a rotation speed measured by the tachometer.

7. The method of claim 1, said moving part including a rotor, said fitting point of the incremental sensor being a rim of the rotor, and said transmission ratio being further determined by a diameter of the rotor.

8. Apparatus for determining the movement of a synchronous machine, having an input for a movement signal of an incremental sensor, the apparatus comprising:
the incremental sensor fitted to a surface of a moving part of the synchronous machine at a fitting point such that the incremental sensor detects relative motion of the surface of the moving part at the fitting point and the movement signal of the incremental sensor represents the relative movement of the surface of the moving part at the fitting point;
an electrical magnitude detector for determining at least one electrical magnitude of the synchronous machine;
a position error determination unit that determines position error of the moving part of the synchronous machine based on said determined electrical magnitude and a transmission ratio determined by a linear movement range detected by the incremental sensor at the fitting point;
a low-pass filter that filters the position error; and
a signal correction unit that corrects the input movement signal of the incremental sensor based on the filtered position error by repetitively summing a correction term, which is proportional to a magnitude of the position error, into the input movement signal such that cumulative movement signal errors and errors caused by variations or changes in the linear movement range are accounted for and supplies the corrected movement signal to a controller for controlling the synchronous machine.

9. Apparatus according to claim 8, where the position error determination unit is configured to use information about the source voltage of the synchronous machine conveyed by said electrical magnitude for determining the position error.

10. Apparatus according to claim 8 or 9, the apparatus further comprising:
a maximum permitted travel distance determination unit that determines a maximum permitted travel distance of an essentially low speed of the synchronous machine based on the determined position error.

11. The apparatus of claim 8, where the incremental sensor is fitted onto the moving part via a friction wheel.

12. The apparatus of claim 8, where the input movement signal includes a measurement of linear distance traveled by the fitting point.

13. The apparatus of claim 8, where the incremental sensor includes a tachometer, and where the input movement signal includes information about a rotation speed measured by the tachometer.

14. The apparatus of claim 8, where the moving part is a rotor and the fitting point of the incremental sensor is on a side of the rotor, and said transmission ratio being further determined by a radius from a center of the rotor to the fitting point.

15. The apparatus of claim 8, said moving part including a rotor, the fitting point of the incremental sensor being a rim of the rotor, and said transmission ratio being further determined by a diameter of the rotor.

16. System for determining the movement of a conveying apparatus, the system comprising:
a synchronous motor for moving the conveying apparatus;
an incremental sensor fitted to a surface of a moving part in connection with the synchronous motor at a fitting point such that the incremental sensor detects relative motion of the surface of the moving part at the fitting point, the incremental sensor producing a movement signal that represents the relative movement of the surface of the moving part at the fitting point;
an electrical magnitude determination unit for determining at least one electrical magnitude of the synchronous motor
a position error determination unit for determining a position error of the moving part of the synchronous motor, said position error determination unit being fitted to determine the position error of the moving part based on said at least one electrical magnitude and linear movement range detected by the incremental sensor the fitting point;
a low-pass filter that filters the position error;
a movement signal correction unit for making correction of the movement signal of the incremental sensor, said movement signal correction unit being fitted to correct a read movement signal of the incremental sensor based on said filtered position error by repetitively summing a correction term, which is proportional to a magnitude of the position error, into the read movement signal such that cumulative movement signal errors and errors caused by variations or changes in the linear movement range are accounted for;
a movement determination unit for determining movement of the conveying apparatus, said movement determination unit being fitted to determine the movement of the conveying apparatus on the basis of the corrected movement signal of the incremental sensor.

17. System according to claim 16, where said at least one electrical magnitude includes information about a source voltage of the synchronous motor; and
where the position error determination unit is configured to determine the position error of the moving part of the synchronous motor using the information about the source voltage.

18. System according to claim 16 or 17, the system further comprising:
a permitted travel distance determination unit for determining a maximum permitted travel distance of an essentially low speed of the conveying apparatus, said permitted travel distance determination unit being fitted to determine the maximum permitted travel distance of the essentially low speed of the conveying apparatus based on the determined position error.

19. System according to claim 18, wherein the aforementioned conveying apparatus comprises an elevator car, the moving part comprises a rotor, the fitting point is disposed on a rim of the rotor, and a transmission ratio is determined by a diameter of the rotor.

20. System according to claim 17, wherein the aforementioned conveying apparatus comprises an elevator car, the moving part comprises a rotor, the fitting point is disposed on a rim of the rotor, and a transmission ratio is determined by a circumference of the rotor.

21. System according to claim 16, wherein the aforementioned conveying apparatus comprises an elevator car, the moving part comprises a rotor, the fitting point is disposed on a rim of the rotor, and a transmission ratio is determined by a diameter of the rotor.

22. The system of claim 16, where the incremental sensor includes a tachometer and where the read movement signal includes information about a rotation speed measured by the tachometer.

23. The system of claim 16, said moving part including a rotor, the fitting point of the incremental sensor being a side of the rotor, and a transmission ratio being determined by a radius from a center of the rotor to the fitting point.

* * * * *